UNITED STATES PATENT OFFICE.

JOSEPH WILLIAMS, JR., OF PITTSBURG, PENNSYLVANIA.

BOILER COMPOUND.

No. 868,149.           Specification of Letters Patent.           Patented Oct. 15, 1907.

Application filed May 21, 1906. Serial No. 317,928.

*To all whom it may concern:*

Be it known that I, JOSEPH WILLIAMS, Jr., a citizen of the United States, residing at Pittsburg, in the county of Allegheny and State of Pennsylvania, have invented certain new and useful Improvements in Boiler-Cleaning Compounds, of which the following is a specification, reference being had therein to the accompanying drawing.

My invention refers to improvements in compositions for the purpose of cleaning boilers or boiler tubes, and it consists of a fluid mixture composed of certain ingredients, hereinafter referred to, which mixture is charged into or impregnated with the water contents of the boiler. Its action is to neutralize any acid in the boiler water and to disintegrate and precipitate the scale formed from the lime and other impurities usually found in water in a greater or less extent. The compound operates by chemical reaction.

The following is a list of ingredients employed in my improved boiler cleansing compound, in the proportions in which the different ingredients are used, it being understood that the amounts given approximate the proportionate fractions of any given unit, as 100, and that they may be increased or reduced in proportion according to the volume required, or to suit varying conditions.

Sodium carbonate.. 7500 pounds or 13 parts.
     Sulfur............. 2344 pounds or 4 parts.
     Water sufficient to dissolve.
     Sodium hydrate .. 9850 pounds or 17 parts.
     Water............. 39000 pounds or 66 parts.

The sodium carbonate in the form of fine dry powder and the sulfur are thoroughly mixed and the mixture gradually heated until the sulfur melts, stirring continually while hot in order that every portion of it may be exposed to the atmosphere. Sufficient water is then added to dissolve. The sodium hydrate is then added and then the main body of water, the whole mixture being heated or kept hot until all of the ingredients are entirely dissolved and thoroughly mixed with the water, in which they will thereafter remain in suspension without precipitation.

In applying the mixture or compound, a sufficient amount is charged into the water, dependent upon the quality or condition of the water of the boiler itself, in which it will become diffused. In the circulation throughout the boiler or its tubes, the treated water will be freed from the lime and other deposits, while any such deposits or scale adhering to the interior of the boiler will be precipitated and may be readily removed.

I do not desire to be limited to the exact proportions given above as good results may be secured by varying the proportions or amounts within certain limits, and it will be understood that such changes or variations may be made by the chemist or others to suit the local conditions.

Having described my invention, what I claim is:

1. The method of manufacturing boiler cleansing compound consisting in the following steps. First mixing sodium carbonate in the form of fine dry powder with sulfur and heating the same; adding sufficient water to dissolve; adding sodium hydrate and water and thoroughly mixing the ingredients together, substantially in the manner described.

2. The herein described boiler cleansing compound consisting of a mixture of sodium carbonate, sulfur, sodium hydrate, and water.

3. The herein described boiler cleansing compound consisting of a mixture of sodium carbonate, sulfur, sodium hydrate, and water, in substantially the proportions given.

In testimony whereof I affix my signature in presence of two witnesses.

JOSEPH WILLIAMS, Jr.

Witnesses:
     CHAS. S. LEPLEY,
     C. M. CLARKE.